United States Patent

Sato et al.

[11] Patent Number: 5,852,239
[45] Date of Patent: Dec. 22, 1998

[54] FLOW SENSOR HAVING AN INTERMEDIATE HEATER BETWEEN TWO TEMPERATURE-SENSING HEATING PORTIONS

[75] Inventors: Yukito Sato; Takayuki Yamaguchi; Hiroyoshi Shoji; Junichi Azumi, all of Sendai; Morimasa Kaminishi, Shiroishi, all of Japan

[73] Assignees: Ricoh Company, Ltd., Tokyo; Ricoh Elemex Corporation, Nagoya; Ricoh Seiki Company, Ltd., Tokyo, all of Japan

[21] Appl. No.: 873,455

[22] Filed: Jun. 12, 1997

[30] Foreign Application Priority Data

Jun. 12, 1996 [JP] Japan ..................................... 8-150643

[51] Int. Cl.$^6$ ....................................................... G01F 1/68
[52] U.S. Cl. ....................................................... 73/204.26
[58] Field of Search ........................... 73/204.26, 204.25, 73/204.23, 204.17, 204.15, 204.11

[56] References Cited

U.S. PATENT DOCUMENTS 4,651,564  3/1987  Johnson et al. ...................... 73/204.26
5,291,781  3/1994  Nagata et al. ...................... 73/204.26

FOREIGN PATENT DOCUMENTS 0193019   9/1990  Japan ................................. 73/204.25
2-259527  10/1990  Japan .
3-52028   8/1991  Japan .
6-43906   6/1994  Japan .

Primary Examiner—Elizabeth L. Dougherty
Assistant Examiner—Harshad Patel
Attorney, Agent, or Firm—Oblon, Spivak, McClelland, Maier & Neustadt, P.C.

[57] ABSTRACT

A flow sensor includes a first heating portion, provided at a first position in a flow of a fluid, which heats the fluid and outputs a voltage in response to a temperature of the first position. A second heating portion, provided at a second, downstream position in the flow of the fluid, heats the fluid and outputs a voltage in response to a temperature of the second position, the first position and the second position being spaced from each other in a direction parallel to the flow of the fluid. An intermediate heater, provided between the first heating portion and the second heating portion, heats the fluid at an intermediate position between the first position and the second position.

8 Claims, 6 Drawing Sheets

FLOW SENSOR HAVING AN INTERMEDIATE HEATER BETWEEN TWO TEMPERATURE-SENSING HEATING PORTIONS

BACKGROUND OF THE INVENTION

(1) Field of the Invention

The present invention relates to a flow sensor which senses a flow rate of a fluid based on a difference between voltages output by two temperature-sensitive heating portions in response to temperatures of two positions spaced along a flow of the fluid.

(2) Description of the Related Art

Several types of flow sensor for measuring a flow rate of a fluid such as tap water or city gas are known. Generally, the flow sensor is configured such that a bridge-like supporting portion is formed on a surface of a silicon substrate by using anisotropic etching, the supporting portion extending in a direction perpendicular to a flow of the fluid. In a certain type of the flow sensor, a first temperature sensor, a heating element and a second temperature sensor are arranged on the supporting portion of the flow sensor at positions spaced along the flow of the fluid.

Generally, the flow sensor measures a flow rate of the fluid based on a difference between temperatures sensed by the first temperature sensor and the second temperature sensor. Hereinafter, a volumetric quantity of a fluid flowing through a unit area per unit time is called a flow rate of the fluid. When the fluid is heated by the heating element and flows, the heat energy is transferred from the upstream position of the first temperature sensor to the downstream position of the second temperature sensor. Thus, the flow sensor senses a flow rate of the fluid based on a difference between the two sensed temperatures.

In another type of the flow sensor, first and second temperature-sensitive heating portions are arranged at upstream and downstream positions spaced along the flow of the fluid. When the fluid is heated by the two heating portions and flows, the heat energy is transferred from the upstream position to the downstream position. Thus, the flow sensor senses a flow rate of the fluid based on a difference between voltages output by the two temperature-sensitive heating portions in response to temperatures of the two positions.

Japanese Laid-Open Patent Application No.2-259527 and Japanese Published Patent Application No.3-52028 disclose a flow sensor in which a first thin-film heating element and a second thin-film heating element are arranged at upstream and downstream positions spaced along the flow of the fluid.

Further, Japanese Published Patent Application No.6-43906 discloses another type of flow sensor. In the flow sensor of the above-mentioned publication, first and second temperature-sensitive heating portions are arranged at upstream and downstream positions spaced along the flow of the fluid.

More specifically, in the flow sensor of the above-mentioned publication, the first temperature-sensitive heating portion includes a first thin-film temperature sensor for sensing a temperature of the upstream position and a first thin-film heater for heating the fluid. Further, in the flow sensor, the second temperature-sensitive heating portion includes a second thin-film heater for heating the fluid and a second thin-film temperature sensor for sensing a temperature of the downstream position. The first thin-film temperature sensor, the first thin-film heater, the second thin-film heater and the second thin-film temperature sensor are arranged in this order at positions spaced along the flow of the fluid.

In the above-described flow sensors, a flow rate of the fluid is measured based a difference between voltages output by the two heating portions in response to temperatures of the upstream and downstream positions at which the first and second heating portions are arranged along the flow of the fluid.

However, when the fluid flow at a very high flow rate, the heat energy supplied to the fluid at the downstream position by the second heating portion gets smaller than the heat energy transferred to the fluid at the downstream position from the second heating portion. If the flow rate is higher than a certain value, the relationship between the flow rate and the output voltage difference is separate from the linearity. In an extreme case, the flow-rate measurements by the above-described flow sensors result in saturation.

FIG. 1 shows results of flow-rate measurements by a conventional flow sensor such as the above-described flow sensors. As shown in FIG. 1, the relationship between the flow rate and the output voltage difference is separate from the linearity when the flow rate of the fluid increases.

When the linearity between the flow rate and the output voltage difference is lost as shown in FIG. 1, it is difficult to provide accurate flow-rate measurements by using the conventional flow sensor. Therefore, the above-described flow sensors have a problem that it is difficult to provide accurate flow-rate measurements when the flow rate of the fluid is very high.

SUMMARY OF THE INVENTION

An object of the present invention is to provide an improved flow sensor in which the above-described problems are eliminated.

Another object of the present invention is to provide a flow sensor which provides accurate flow-rate measurements over a wide range of flow rates of fluid based on a difference between voltages output by two temperature-sensitive heating portions in response to temperatures of upstream and downstream positions.

The above-mentioned objects of the present invention are achieved by a flow sensor which comprises: a first heating portion, provided at a first position in a flow of a fluid, which heats the fluid and outputs a voltage in response to a temperature of the first position; a second heating portion, provided at a second, downstream position in the flow of the fluid, which heats the fluid and outputs a voltage in response to a temperature of the second position, the first position and the second position being spaced from each other in a direction parallel to the flow of the fluid; and an intermediate heater, provided between the first heating portion and the second heating portion, which heats the fluid at an intermediate position between the first position and the second position.

The flow sensor of the present invention senses a flow rate of the fluid based on a difference between the voltages output by the first heating portion and the second heating portion while the fluid at the first position, at the intermediate position and at the second position is heated by the first heating portion, the intermediate heater and the second heating portion. When the fluid flows at a high flow rate, the relationship between the heat energy supplied to the fluid at the downstream position by the second heating portion and the heat energy transferred to the fluid at the downstream position from the second heating portion is maintained in a suitable condition by the heat energy supplied to the fluid at the intermediate position by the intermediate heater. It is possible for the flow sensor of the present invention to provide accurate flow-rate measurements over a wide range of flow rates of fluid even when the fluid flows at a high flow rate.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 2:
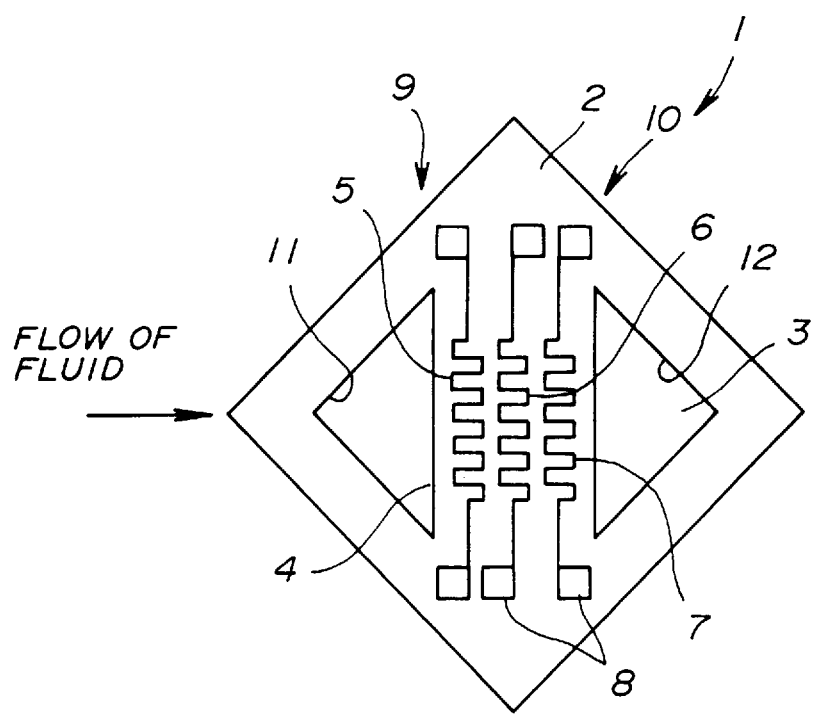
FIG. 2 is a top view of a flow sensor embodying the present invention.

FIG. 2 shows a flow sensor 1 embodying the present invention.

As shown in FIG. 2, the flow sensor 1 comprises a substrate 2 in the shape of a square. A cavity 3 is formed in the substrate 2, and the cavity 3 is a hollow region passing through the thickness of the substrate 2. A supporting portion 4 is formed by a thin film on the substrate 2, and the supporting portion 4 is in the shape of a bridge diagonally extending over the cavity 3 of the substrate 2. The cavity 3 has a pair of side openings 11 and 12 into which the cavity 3 is separated by the supporting portion 4.

When the flow sensor 1 is used, the flow sensor 1 is placed into a flow of a fluid (not shown) such that the supporting portion 4 extends in a horizontal direction perpendicular to the flow of the fluid.

Further, on the surface of the supporting portion 4 of the flow sensor 1, three thin-film thermistor heating elements 5, 6 and 7 are formed in this order along the flow of the fluid. A plurality of pads 8 are formed on the surface of the substrate 2 at both ends of the supporting portion 4. The pads 8 are connected to the thin-film thermistor heating elements 5, 6 and 7.

In the flow sensor 1, a first heating portion 9 comprises the thin-film thermistor heating element 5 and an upstream region of the supporting portion 4 provided upstream from the heating element 5. A second heating portion 10 comprises the thin-film thermistor heating element 7 and a downstream region of the supporting portion 4 provided downstream from the heating element 7. An intermediate heater of this embodiment comprises the thin-film thermistor heating element 6 which is provided between the first heating portion 9 and the second heating portion 10.

In order to produce the flow sensor 1 of this embodiment, the following production steps are performed.

First, a substrate of mono-crystalline silicon having a 3.0 mm×3.0 mm size and a 525 $\mu$m thickness with a thermal oxidation film of silicon dioxide ($SiO_2$) formed on the entire surface thereof is prepared as the substrate 2. A thickness of the $SiO_2$ film is about 1.0 $\mu$m.

Secondly, a thin film of silicon carbide (SiC) is deposited on the surface of the substrate 2 by high-frequency sputtering. A thickness of the SiC film is about 3000 Å. A patterning of the SiC film is performed by photolithography so that the thin-film thermistor heating elements 5, 6 and 7 are formed. A passivation film of silicon dioxide ($SiO_2$) is deposited on the surfaces of the thin-film thermistor heating elements 5, 6 and 7 by high-frequency sputtering. A thickness of the $SiO_2$ film is about 1.0 $\mu$m. The upper layer of the supporting portion 4 is thus formed by the $SiO_2$ film.

Finally, an etching of the passivation film and the thermal oxidation film is performed such that portions corresponding to the side openings 11 and 12 of the cavity 3 are shaped in the substrate 2. Starting from the side openings 11 and 12, an anisotropic etching of the substrate 2 is performed using a potassium hydroxide (KOH) solution so that the cavity 3 (which is about 300 $\mu$m deep) and the supporting portion 4 are formed in the substrate 2. The supporting portion 4 is comprised of the passivation film and the thermal oxidation film, and the thin-film thermistor heating elements 5, 6 and 7 are formed on the surface of the supporting portion 4.

In the above production steps for the flow sensor 1, the supporting portion 4 is made of $SiO_2$. Alternatively, other materials such as $Ta_2O_5$, $Si_3N_4$ and SiON may be used for a desired dielectric characteristic, mechanical strength and thermal conductivity of the supporting portion 4. Further, in the above production steps for the flow sensor 1, the thin-film thermistor heating elements 5–7 are made of SiC. Alternatively, other materials such as permalloy, platinum, polysilicon and amorphous silicon may be used for a desired thermal coefficient of resistance and stability of the thin-film thermistor heating elements 5–7.

Further, in the above production steps, sputtering is used to deposit the thin films on the substrate. Alternatively, vacuum evaporation and chemical vapor deposition processes may be used in view of the characteristics of the materials. In addition, the present invention is not limited to the particular dimensions or shape of the flow sensor of this embodiment, and variations and modifications may be made in accordance with desired measurement conditions and flow-sensor characteristics.

In the flow sensor 1 of the above-described embodiment, a power supply (not shown) is electrically connected to each of the thin-film thermistor heating elements 5, 6 and 7 via the pads 8, and a detecting unit (not shown) is electrically connected to each of the thin-film thermistor heating elements 5 and 7. A constant current from the power supply is supplied to the heating elements 5–7 so that the fluid is heated by the heating elements 5–7 at the three spaced positions to a constant raised temperature. The detecting unit comprises a bridge circuit including the thermistor heating elements 5 and 7 and two fixed resistors. The detecting unit senses a change in the ratio of resistances of the thermistor heating elements 5 and 7 by detecting a difference between voltages output by the thermistor heating elements 5 and 7 in response to temperatures of the upstream and downstream positions in the flow of the fluid while the fluid at the upstream position, at the intermediate position and at the downstream position is heated by the first heating portion 9, the intermediate heater 6 and the second heating portion 10. The detecting unit outputs a signal indicating a flow rate of the fluid with a good sensitivity of the flow rate measurement.

When the power is supplied to the flow sensor 1 but the fluid does not flow, the temperatures of the upstream and downstream positions in the fluid heated by the first and second heating portions 9 and 10 are the same. The flow sensor 1 outputs a signal indicating that a flow rate of the fluid is equal to zero.

When the power is supplied to the flow sensor 1 and the fluid flows, the fluid is heated by the first heating portion 9, the intermediate heater 6 and the second heating portion 10 arranged in this order in the flow of the fluid, and a difference between the temperatures of the upstream and downstream positions is produced due to the flow of the fluid. The flow sensor 1 senses a flow rate of the fluid based on a difference between voltages output by the first heating portion 9 and the second heating portion 10 in response to the temperatures of the upstream and downstream positions.

When the fluid flows at a high flow rate, the relationship between the heat energy supplied to the fluid at the downstream position by the second heating portion 10 and the heat energy transferred to the fluid at the downstream position from the second heating portion 10 is maintained in a suitable condition by the heat energy supplied to the fluid at the intermediate position by the intermediate heater 6. A difference between the temperatures of the upstream and downstream positions is appreciable. The flow sensor 1 provides accurate flow-rate measurement based on a difference between voltages output by the first heating portion 9 and the second heating portion 10 in response to the temperatures of the upstream and downstream positions.

Figure 1:
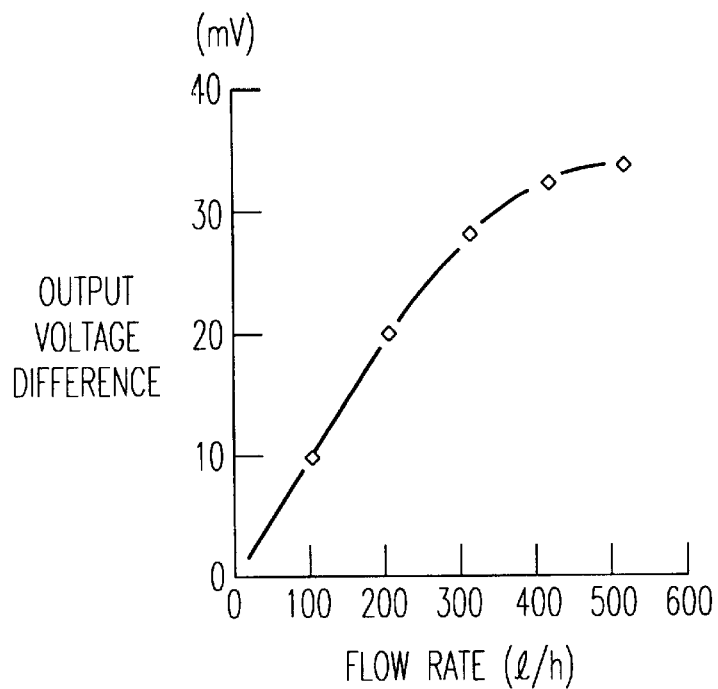
FIG. 1 is a diagram for explaining results of flow-rate measurements by a conventional flow sensor.
Figure 3:
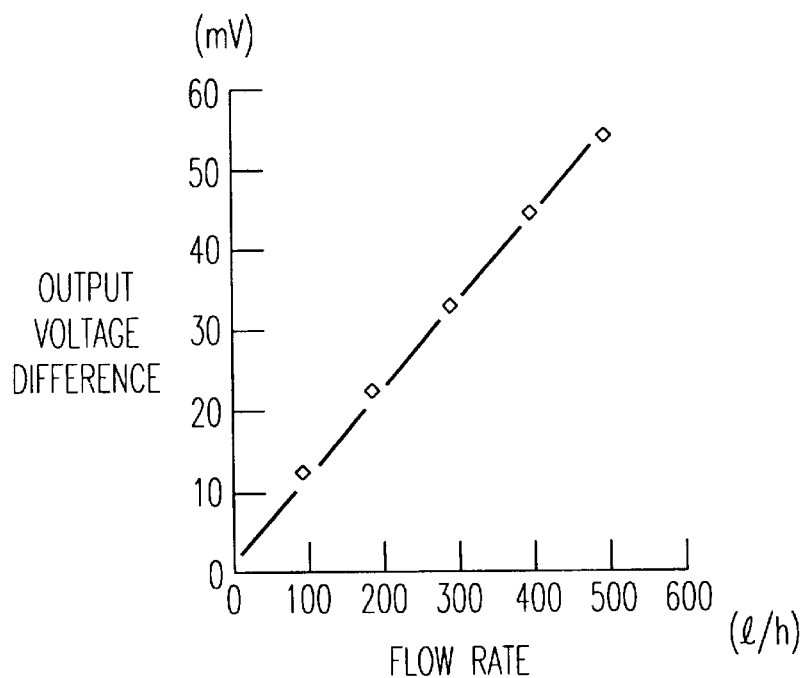
FIG. 3 is a diagram for explaining results of flow-rate measurements by the flow sensor of FIG. 2.

FIG. 3 shows results of flow-rate measurements by the flow sensor 1 of FIG. 2. As shown in FIG. 3, in the case of the flow sensor 1, the linearity between the flow rate and the output voltage difference is maintained even when the flow rate of the fluid increases. In the case of the flow sensor 1, the flow-rate measurements by the flow sensor 1 are hardly placed into saturation.

Accordingly, the flow sensor 1 can provide accurate flow-rate measurements over a wide range of flow rates of fluid even when the fluid flows at a high flow rate. In addition, in the flow sensor 1 of the above-described embodiment, the first heating portion 9 heats the fluid at the upstream position and outputs a voltage in response to a temperature of the upstream position, and the second heating portion 10 heats the fluid at the downstream position and outputs a voltage in response to a temperature of the downstream position. The flow sensor 1 of the present embodiment provides a simple structure of the flow sensor and is advantageous to increase productivity.

Figure 4:
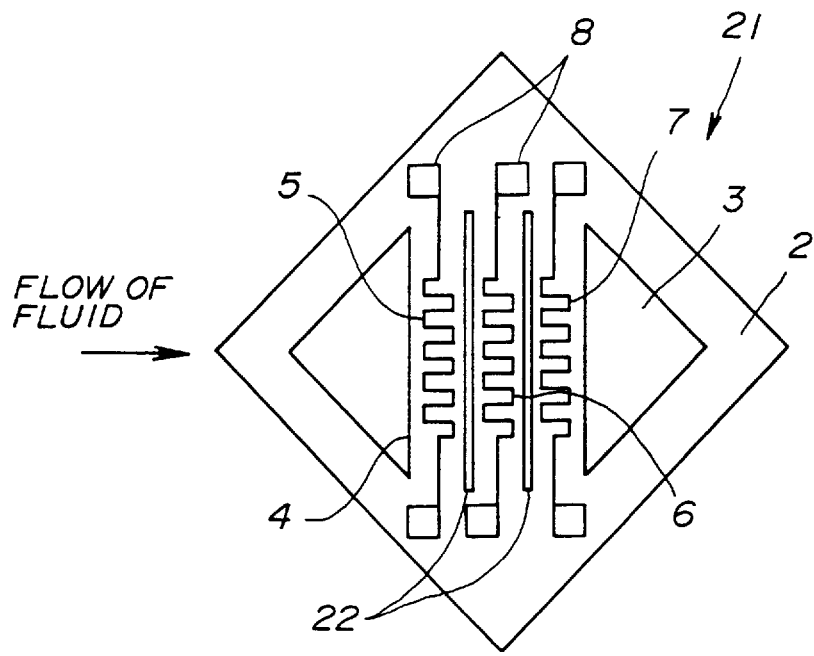
FIG. 4 is a top view of a variation of the flow sensor of FIG. 2.

FIG. 4 shows a variation of the flow sensor 1 of FIG. 2. A flow sensor 21 is shown in FIG. 4. In FIG. 4, the elements which are the same as corresponding elements of the flow sensor 1 are designated by the same reference numerals, and a description thereof will be omitted.

When the flow sensor 1 of FIG. 2 is used, the fluid is heated by the heating elements 5, 6 and 7 through the supporting portion 4. A sensitivity of the flow-rate measurement by the flow sensor 1 may be lowered if a thermal conductivity of the supporting portion 4 is low. In order to avoid this problem, the flow sensor 21 includes a set of slits 22 which are formed in the supporting portion 4. One of the slits 22 is provided between the thin-film thermistor heating element 5 (or the first heating portion) and the intermediate heater 6, and the other slit 22 is provided between the intermediate heater 6 and the thin-film thermistor heating element 7 (or the second heating portion). The slits 22 increase a thermal conductivity of the supporting portion 4 and improves a sensitivity of the flow-rate measurement by the flow sensor 21.

Although the flow sensor 21 improves the sensitivity of the flow-rate measurement, the strength of the supporting portion 4 is lowered and the structure of the supporting portion 4 is complicated. Therefore, it is desirable that one of the flow sensor 1 and the flow sensor 21 be selectively used by taking into account the required performance and productivity of the flow sensor.

Figure 5:
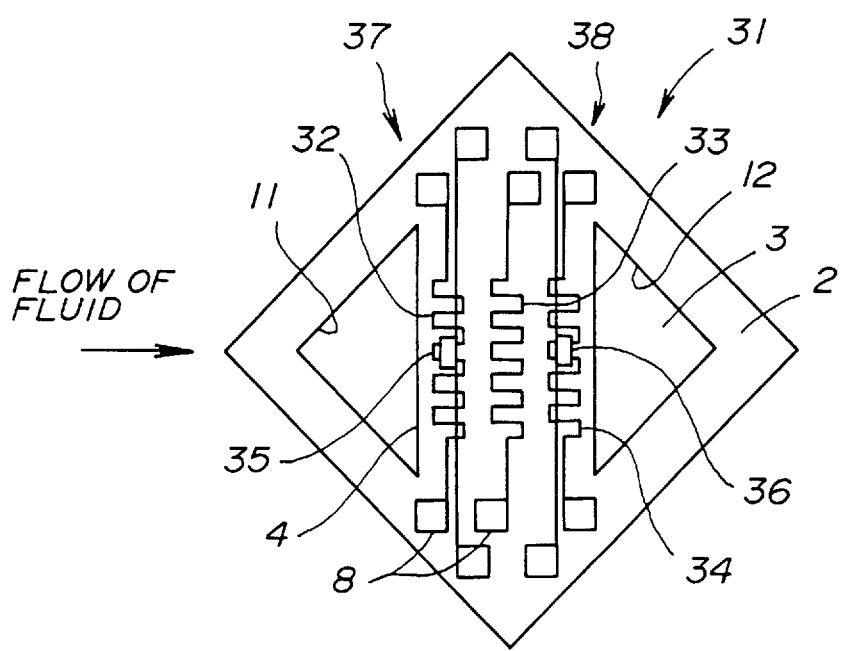
FIG. 5 is a top view of another flow sensor embodying the present invention.

Next, FIG. 5 shows a flow sensor 31 embodying the present invention. In FIG. 5, the elements which are the same as corresponding elements of the flow sensor 1 are designated by the same reference numerals, and a description thereof will be omitted.

As shown in FIG. 5, the flow sensor 31 includes the substrate 2 with the cavity 3 therein, and the supporting portion 4. The supporting portion 4 is formed on the substrate 2 in the shape of a bridge diagonally extending over the cavity 3 of the substrate 2. When the flow sensor 31 is used, the supporting portion 4 is arranged such that the supporting portion 4 extends in a horizontal direction perpendicular to the flow of the fluid.

In the flow sensor 31, three thin-film heating elements 32, 33 and 34 are formed on the surface of the supporting portion 4 in this order in the direction parallel to the flow of the fluid. A thin-film temperature-sensing element 35 is formed on a surface of the heating element 32, and a thin-film temperature-sensing element 36 is formed on a surface of the heating element 34.

In the flow sensor 31, a first heating portion 37 comprises the thin-film heating element 32, the thin-film temperature-sensing element 35, and an upstream region of the supporting portion 4 provided upstream from the heating element 32. A second heating portion 38 comprises the thin-film heating element 34, the thin-film temperature-sensing element 36, and a downstream region of the supporting portion 4 provided downstream from the heating element 34. The intermediate heater of this embodiment comprises the thin-film heating element 33.

Therefore, similarly to the flow sensor 1 of FIG. 2, in the flow sensor 31, the first heating portion 37, the intermediate heater 33 and the second heating portion 38 are formed on the surface of the supporting portion 4.

In order to produce the flow sensor 31 of this embodiment, the following production steps are performed.

First, a substrate of mono-crystalline silicon having a thermal oxidation film of silicon dioxide ($SiO_2$) formed on the entire surface thereof is prepared as the substrate 2. A thickness of the $SiO_2$ film is about 1.0 $\mu$m.

Secondly, a thin film of tantalum nitride ($Ta_2N$) is deposited on the thermal oxidation film of the substrate 2 by direct-current sputtering. A thickness of the $Ta_2N$ film is about 3000 Å. A patterning of the $Ta_2N$ film is performed so that the thin-film heating elements 32, 33 and 34 are formed.

Thirdly, a thin film of silicon oxide ($SiO_2$) is deposited as an insulation film on the heating elements 32–34 by high-frequency sputtering. A thickness of the insulation film is about 5000 Å. Further, a thin film of silicon carbide (SiC) is deposited on the insulation film of $SiO_2$ by high-frequency sputtering. A thickness of the Sic film is about 2000 Å. A patterning of the SiC film is performed so that the thin-film temperature-sensing elements 35 and 36 are formed.

Finally, a thin film of silicon oxide ($SiO_2$) (about 1.0 $\mu$m thick) is deposited as a passivation film on the surface of the temperature-sensing elements 35 and 36 by high-frequency sputtering, and an anisotropic etching of the substrate 2 is performed using a potassium hydroxide (KOH) solution to remove the passivation film, so that the cavity 3 (about 300 $\mu$m deep) and the supporting portion 4 are formed in the substrate 2. This step is similar to that of the production steps for the flow sensor 1.

In the above production steps, the thin-film heating elements 32–34 are made of $Ta_2N$. Alternatively, other materials such as $TaSiO_2$ and NiCr may be used for a desired thermal conductivity and stability of the thin-film heating elements 32–34. Further, in the above production steps, the thin-film temperature-sensing elements 35 and 36 are made of SiC. Alternatively, other materials such as $Fe_2O_3$, MnO, Pt and Ge may be used for a desired thermal coefficient of resistance and stability of the thin-film temperature-sensing elements 35 and 36.

In the flow sensor 31 of the above-described embodiment, a power supply (not shown) is electrically connected to each of the thin-film heating elements 32, 33 and 34, and a detecting unit (not shown) is electrically connected to each of the thin-film temperature-sensing elements 35 and 36. A constant current from the power supply is supplied to the heating elements 32–34 so that the fluid is heated by the heating elements 32–24 to a constant raised temperature. The detecting unit comprises a bridge circuit including the temperature-sensing elements 35 and 36 and two constant resistors. The detecting unit senses a change in the ratio of resistances of the temperature-sensing elements 35 and 36 by detecting a difference between voltages output by the temperature-sensing elements 35 and 36 in response to temperatures of the fluid at the temperature-sensing elements 35 and 36. The detecting unit outputs a signal indicating a flow rate of the fluid with a good sensitivity of the flow rate measurement.

Accordingly, the flow sensor 31 senses a flow rate of the fluid based on a difference between the voltages output by the temperature-sensing elements 35 and 36 while the fluid is heated at the upstream position, at the intermediate position and at the downstream position by the heating element 32, the intermediate heater 33 and the heating element 34.

When the power is supplied to the flow sensor 31 but the fluid does not flow, the temperatures of the upstream and downstream positions in the fluid heated by the first and second heating portions 37 and 38 are the same. The flow sensor 31 outputs a signal indicating that a flow rate of the fluid is equal to zero.

When the power is supplied to the flow sensor 31 and the fluid flows, the fluid is heated by the first heating portion 37, the intermediate heater 33 and the second heating portion 38 arranged in this order in the flow of the fluid. A difference between the temperatures of the upstream and downstream positions is produced due to the flow of the fluid. The flow sensor 31 senses a flow rate of the fluid based on a difference between voltages output by the first heating portion 32 and the second heating portion 38 in response to the temperatures of the upstream and downstream positions.

In the flow sensor 31 of the above-described embodiment, when the fluid flows at a high flow rate, the fluid is heated at the upstream position, at the intermediate position and at the downstream position by the first heating portion 37, the intermediate heater 33 and the second heating portion 38. The relationship between the heat energy supplied to the fluid at the downstream position by the second heating portion 38 and the heat energy transferred to the fluid at the downstream position from the second heating portion 38 is maintained in a suitable condition by the heat energy supplied to the fluid at the intermediate position by the intermediate heater 33. A difference between the temperatures of the upstream and downstream positions is appreciable. Therefore, the flow sensor 31 provides accurate flow-rate measurements over a wide range of flow rates of fluid.

In the flow sensor 31 of the above-described embodiment, the first heating portion 37 comprises the thin-film heating element 32, the thin-film temperature-sensing element 35 and an upstream region of the supporting portion 4 provided upstream from the heating element 32. The second heating portion 38 comprises the thin-film heating element 34, the thin-film temperature-sensing element 36 and a downstream region of the supporting portion 4 provided downstream from the heating element 34. The intermediate heater of this embodiment comprises the thin-film heating element 33. Therefore, the heating function and the temperature-sensing function are achieved under appropriate conditions by controlling the first heating portion 37, the second heating condition 38 and the intermediate heater 33.

Although the flow sensor 31 achieves the heating function and the temperature-sensing function under appropriate conditions, the structure of the first and second heating portions 37 and 38 is complicated and productivity is lowered. Therefore, it is desirable that one of the flow sensor 1 and the flow sensor 31 be selectively used by taking into account the required performance and productivity of the flow sensor.

In addition, a variation of the flow sensor 31, which is similar to the flow sensor 21 of FIG. 4, may be made by providing the slits 22 for the flow sensor 31 in addition to the elements of the flow sensor 31. In a case of such flow sensor, it is possible to increase a thermal conductivity of the supporting portion 4 and improve a sensitivity of the flow-rate measurement by the flow sensor.

Figure 6:
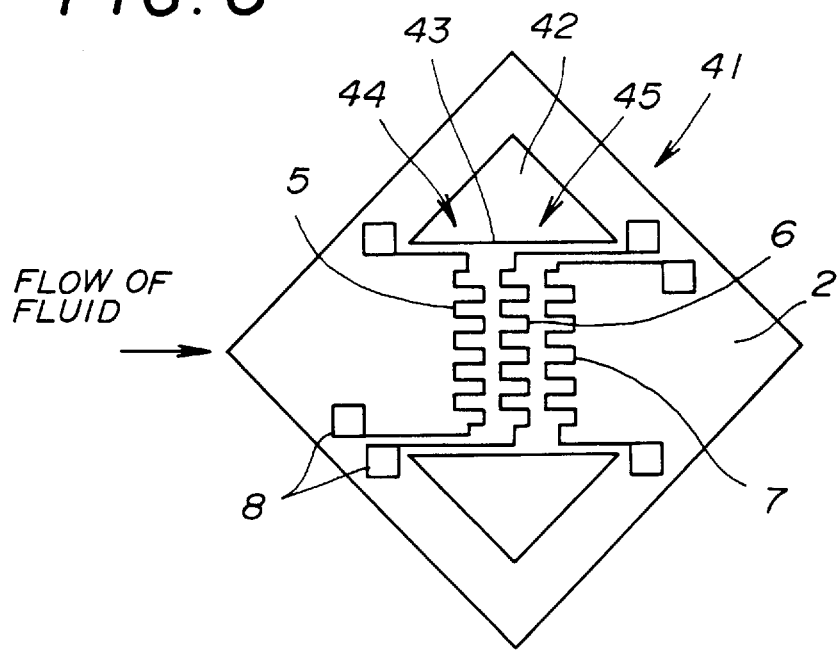
FIG. 6 is a top view of a further flow sensor embodying the present invention.

Next, FIG. 6 shows a flow sensor 41 embodying the present invention. In FIG. 6, the elements which are the same as corresponding elements of the flow sensor 1 of FIG. 2 are designated by the same reference numerals, and a description thereof will be omitted.

As shown in FIG. 6, the flow sensor 41 of this embodiment includes the substrate 2 with a cavity 42 therein, and a supporting portion 43. The supporting portion 43 is formed on the substrate 2 in the shape of a bridge diagonally extending over the cavity 42 of the substrate 2. When the flow sensor 41 is used, the supporting portion 43 is arranged such that the supporting portion 43 extends in a horizontal direction parallel to the flow of the fluid.

In the flow sensor 41, the thin-film thermistor heating elements 5, 6 and 7 are formed on a surface of the supporting portion 43 in this order along the flow of the fluid. However, the thin-film thermistor heating elements 5, 6 and 7 are arranged on the supporting unit 43 such that the heating elements 5–7 extend in a horizontal direction perpendicular to the flow of the fluid, similarly to the heating elements 5–7 of the flow sensor 1 of FIG. 2.

In the flow sensor 41, a first heating portion 44 comprises the thermistor heating element 5 and an upstream region of the supporting portion 43 provided upstream from the thermistor heating element 5. A second heating portion 45 comprises the thermistor heating element 7 and a downstream region of the supporting portion 43 provided downstream from the thermistor heating element 7. The intermediate heater of this embodiment comprises the thin-film thermistor heating element 6.

Similar to the flow sensor 1 of FIG. 2, the flow sensor 41 of this embodiment can provide accurate measurements over a wide range of flow rates of a fluid with a high level of accuracy.

In addition, when the flow sensor 41 is placed into the flow of the fluid, the supporting portion 43 is arranged such that the supporting portion 43 extends in the direction parallel to the flow of the fluid. Therefore, dust or foreign matter in the fluid which is detrimental to the characteristics of the flow-rate measurement hardly clogs in the cavity 42 of the substrate 2. The characteristics of the flow sensor 41 is hardly lowered due to the clogging of the dust or foreign matter in the fluid in the cavity 42.

Further, the supporting portion 43 of the flow sensor 41 is not apt to be hit by the dust or foreign matter in the fluid, and the flow sensor 41 provides a long-term durability and a good stability. Further, the supporting portion 43 is not apt to interfere with the flow of the fluid. If any portion of the flow sensor 41 interferes with the flow of the fluid, a turbulence may take place. In a case of the flow sensor 41 including the supporting portion 43, an error of the flow-rate measurement by the flow sensor 41 is hardly produced by a turbulence in the flow of the fluid.

On the other hand, when the flow sensor 41 of this embodiment is used, the flow of the fluid through the cavity 42 of the flow sensor 41 is less smooth than the flow of the fluid through the cavity 3 of the flow sensor 1. The sensitivity and response of the flow rate measurement by the first and second heating portions 44 and 45 may be lower than that by the flow sensor 1. Therefore, it is desirable that one of the flow sensor 1 and the flow sensor 42 be selectively used by taking into account the required performance and productivity of the flow sensor.

Figure 7:
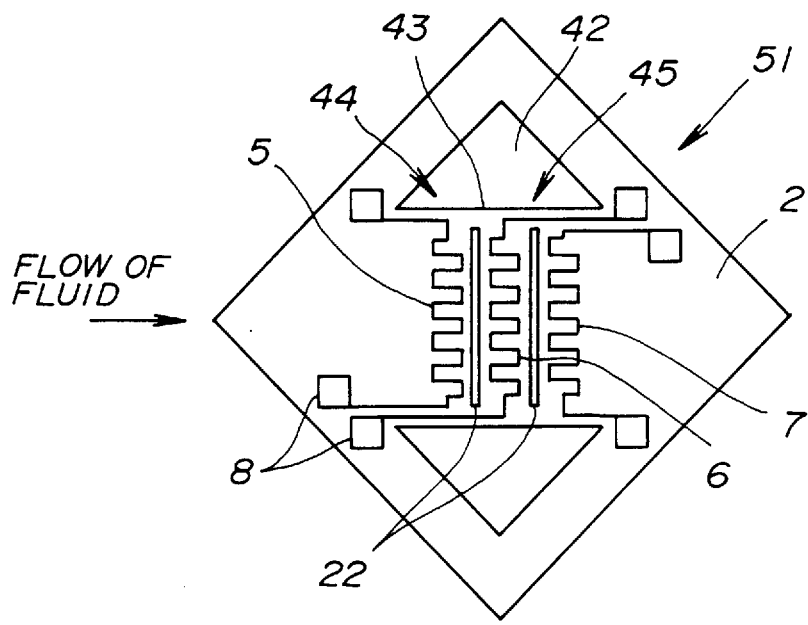
FIG. 7 is a top view of a variation of the flow sensor of FIG. 6.

FIG. 7 shows a variation of the flow sensor 41 of FIG. 6. A flow sensor 51 is shown in FIG. 7. In FIG. 7, the elements which are the same as corresponding elements of the flow sensor 41 of FIG. 6 are designated by the same reference numerals, and a description thereof will be omitted.

Similar to the flow sensor 21 of FIG. 4, the flow sensor 51 of this embodiment includes the slits 22: one of the slits 22 provided between the first heating portion 44 and the intermediate heater 6, and the other slit 22 provided between the intermediate heater 6 and the second heating portion 45. The slits 22 increase a thermal conductivity of the supporting portion 43 and improves a sensitivity of the flow-rate measurement by the flow sensor 51.

Figure 8:
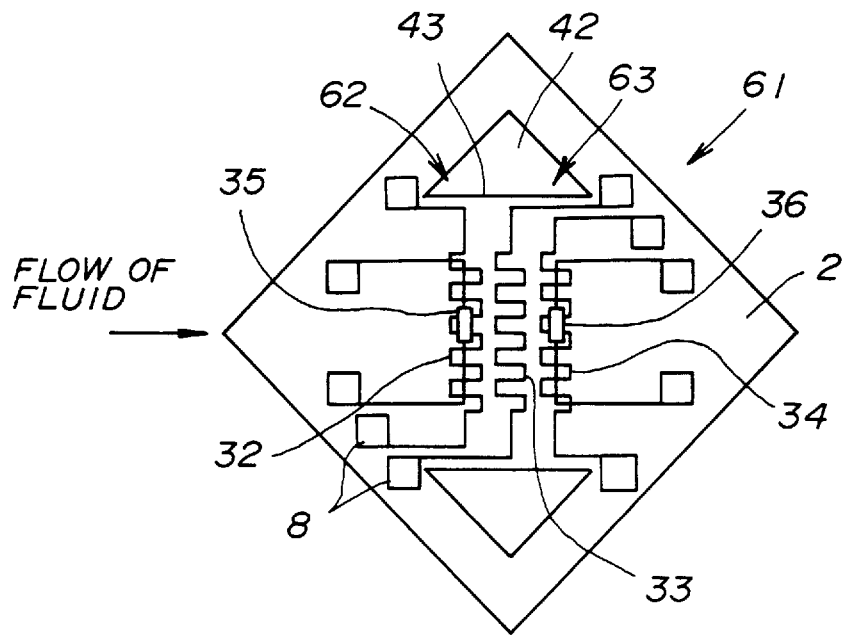
FIG. 8 is a top view of another variation of the flow sensor of FIG. 6.

FIG. 8 shows another variation of the flow sensor 41 of FIG. 6. A flow sensor 61 is shown in FIG. 8. In FIG. 8, the elements which are the same as corresponding elements of the flow sensor 41 of FIG. 6 are designated by the same reference numerals, and a description thereof will be omitted.

Similar to the flow sensor 31 of FIG. 5, the flow sensor 61 of this embodiment includes a first heating portion 62 and a second heating portion 63. In the flow sensor 61, the first heating portion 62 comprises the thin-film heating element 32, the thin-film temperature-sensing element 35 and an upstream region of the supporting portion 43 provided upstream from the heating element 32. The second heating portion 63 comprises the thin-film heating element 34, the thin-film temperature-sensing element 36 and a downstream region of the supporting portion 34 provided downstream from the heating element 34. The intermediate heater of this embodiment comprises the thin-film heating element 33.

Similar to the flow sensor 31, the flow sensor 61 achieves the heating function and the temperature-sensing function under appropriate conditions by controlling the first heating portion 62, the second heating condition 63 and the intermediate heater 33.

Although the flow sensor 61 achieves the heating function and the temperature-sensing function under appropriate conditions, the structure of the first and second heating portions 62 and 63 is complicated and productivity is lowered. Therefore, it is desirable that one of the flow sensor 1 and the flow sensor 61 be selectively used by taking into account the required performance and productivity of the flow sensor.

Figure 9:
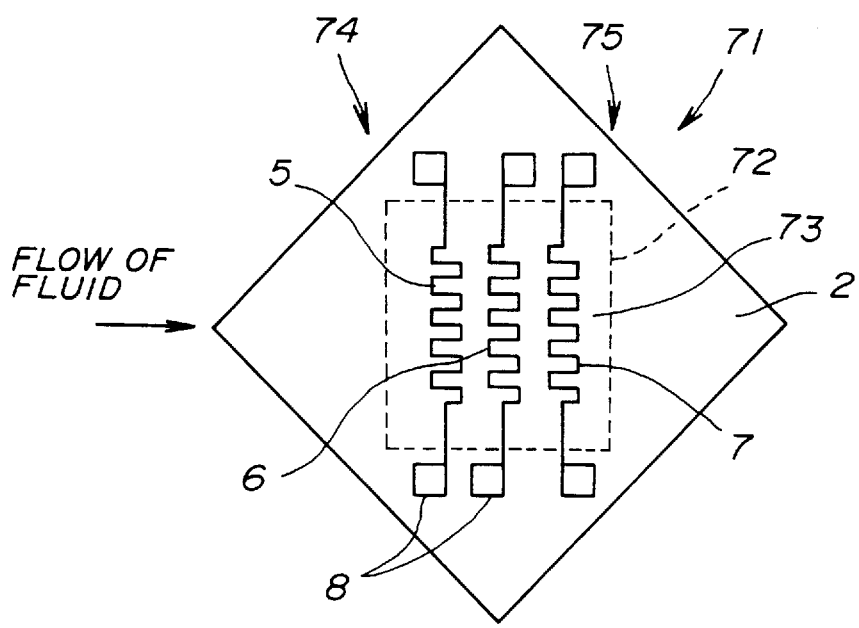
FIG. 9 is a top view of a further flow sensor embodying the present invention.

Next, FIG. 9 shows a flow sensor 71 embodying the present invention. In FIG. 9, the elements which are the same as corresponding elements of the flow sensor 1 of FIG. 2 are designated by the same reference numerals, and a description thereof will be omitted.

As shown in FIG. 9, the flow sensor 71 includes the substrate 2 with a cavity 72 therein, and a supporting portion 73. The cavity 72 which is indicated by a dotted line in FIG. 9 is formed as a recess in the bottom surface of the substrate 2. The supporting portion 73 is formed integrally with the top surface of the substrate 2 as a diaphragm overlaying the cavity 72.

In the flow sensor 71, the thin-film thermistor heating elements 5, 6 and 7 are formed on a surface of the supporting portion 73 in this order along the flow of the fluid. The pads 8 are formed on the surface of the substrate 2 at both ends of the supporting portion 73. The pads 8 are connected to the thin-film thermistor heating elements 5, 6 and 7.

In the flow sensor 71, a first heating portion 74 comprises the thin-film thermistor heating element 5 and an upstream region of the supporting portion 73 provided upstream from the heating element 5. A second heating portion 75 comprises the thin-film thermistor heating element 7 and a downstream region of the supporting portion 73 provided downstream from the heating element 7. The intermediate heater of this embodiment comprises the thin-film thermistor heating element 6 which is provided between the first heating portion 74 and the second heating portion 75.

In order to produce the flow sensor 71 of this embodiment, the following production steps are performed.

First, a substrate of mono-crystalline silicon having a 3.0 mm×3.0 mm size and a 525 μm thickness with a thermal oxidation film of silicon dioxide ($SiO_2$) formed on the entire surface thereof is prepared as the substrate 2. A thickness of the $SiO_2$ film is about 1.0 μm.

Secondly, a thin film of silicon carbide (SiC) is deposited on the surface of the substrate 2 by high-frequency sputtering. A thickness of the SiC film is about 3000 Å. A patterning of the SiC film is performed by photolithography so that the thin-film thermistor heating elements 5, 6 and 7 are formed. A passivation film of silicon dioxide ($SiO_2$) is deposited on the surfaces of the thin-film thermistor heating elements 5, 6 and 7 by high-frequency sputtering. A thickness of the $SiO_2$ film is about 1.0 μm. The upper layer of the supporting portion 73 is thus formed by the $SiO_2$ film.

Finally, an etching of the thermal oxidation film in a 2.0 mm×2.0 mm area of the bottom surface of the substrate 2 is performed such that a corresponding opening is formed in the bottom surface of the substrate 2. Starting from the opening in the bottom surface of the substrate 2, an anisotropic etching of the substrate 2 is performed using a potassium hydroxide (KOH) solution until the thermal oxidation film on the top surface of the substrate 2 is reached. The cavity 72 and the supporting portion 73 are thus formed in the substrate 2. The supporting portion 73 is comprised of the passivation film and the thermal oxidation film on the top surface of the substrate 2, and the thin-film thermistor heating elements 5, 6 and 7 are formed on the surface of the supporting portion 73.

Similar to the flow sensor 1 of FIG. 2, the flow sensor 71 of this embodiment can provide accurate measurements over a wide range of flow rates of a fluid with a high level of accuracy even when the fluid flows at a high flow rate.

In addition, the supporting portion 73 is formed integrally with the top surface of the substrate 2 as the diaphragm overlaying the cavity 72. Therefore, dust or foreign matter in the fluid which is detrimental to the characteristics of the flow-rate measurement hardly clogs in the cavity 72 of the substrate 2. The characteristics of the flow sensor 71 is hardly lowered due to the clogging of the dust or foreign matter in the fluid in the cavity 72. Further, since the supporting portion 73 is formed integrally with the substrate 2 as the diaphragm overlapping the cavity 72, the layout of the thin-film thermistor heating elements 5–7 and the pads 8 in the flow sensor 71 is not restricted. This is different from that in the flow sensor 1 having the supporting portion 4 formed in the shape of a bridge diagonally extending over the cavity 3.

Further, the supporting portion 73 of the flow sensor 71 is not apt to be hit by the dust or foreign matter in the fluid, and the flow sensor 71 provides a long-term durability and a good stability. Further, the supporting portion 73 is not apt to interfere with the flow of the fluid. In a case of the flow sensor 71 including the supporting portion 73, an error of the flow-rate measurement by the flow sensor 71 is hardly produced by a turbulence in the flow of the fluid.

On the other hand, when the flow sensor 71 of this embodiment is used, the thermal conductivity of the supporting portion 73 is lower than the thermal conductivity of the supporting portion 4 of the flow sensor 1. The sensitivity and response of the flow rate measurement by the first and second heating portions 74 and 75 may be lower than that by the flow sensor 1. Therefore, it is desirable that one of the flow sensor 1 and the flow sensor 71 be selectively used by taking into account the required performance and productivity of the flow sensor.

Figure 10:
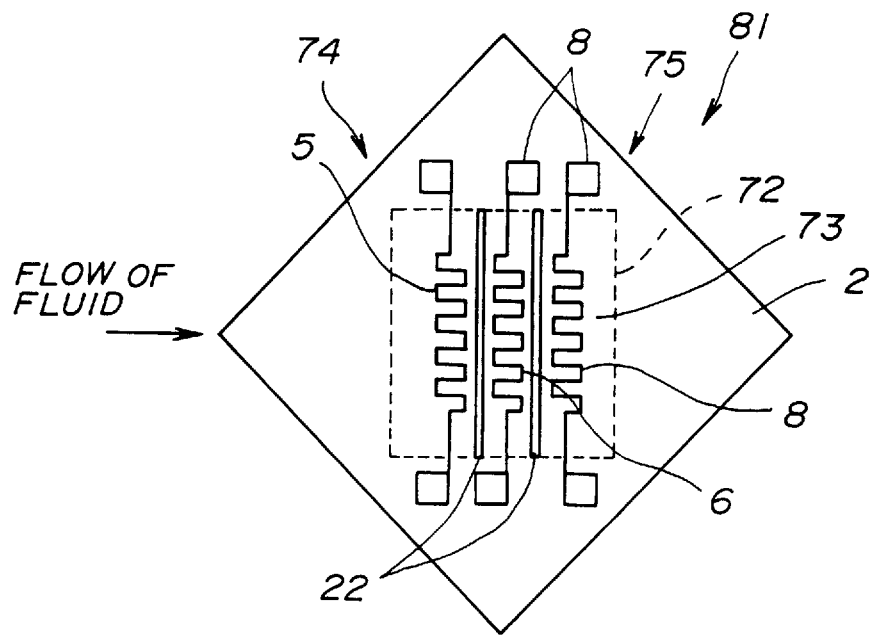
FIG. 10 is a top view of a variation of the flow sensor of FIG. 9.

FIG. 10 shows a variation of the flow sensor 71 of FIG. 9. A flow sensor 81 is shown in FIG. 10. In FIG. 10, the elements which are the same as corresponding elements of the flow sensor 71 are designated by the same reference numerals, and a description thereof will be omitted.

Similar to the flow sensor 21 of FIG. 4, the flow sensor 81 of this embodiment includes the slits 22 which are formed in the supporting portion 73. One of the slits 22 is provided between the first heating portion 74 and the intermediate heater 6, and the other slit 22 is provided between the intermediate heater 6 and the second heating portion 45. The slits 22 increase the thermal conductivity of the supporting portion 73 and improves the sensitivity of the flow-rate measurement by the flow sensor 81.

Figure 11:
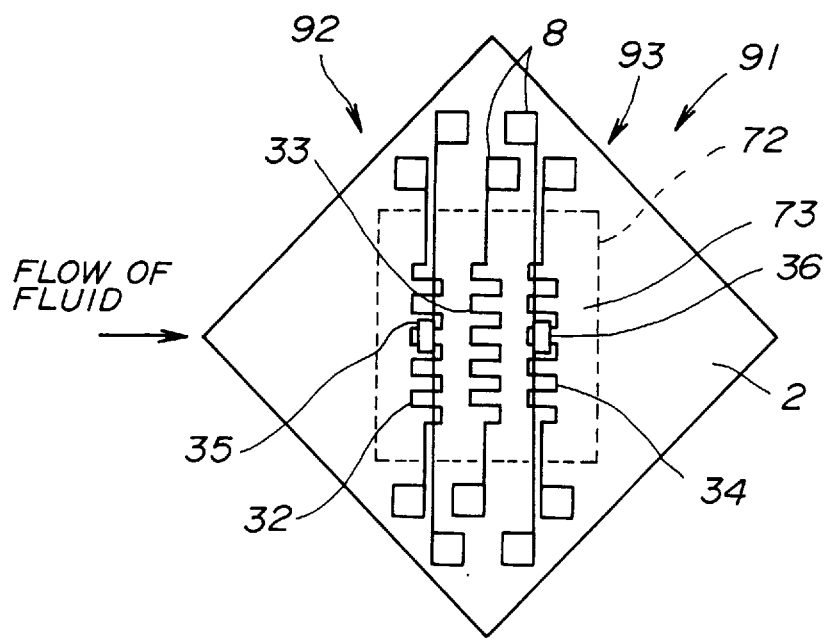
FIG. 11 is a top view of another variation of the flow sensor of FIG. 9.

FIG. 11 shows another variation of the flow sensor 71 of FIG. 9. A flow sensor 91 is shown in FIG. 11. In FIG. 11, the elements which are the same as corresponding elements of the flow sensor 71 are designated by the same reference numerals, and a description thereof will be omitted.

Similar to the flow sensor 31 of FIG. 5, the flow sensor 91 of this embodiment includes a first heating portion 92 and a second heating portion 93. In the flow sensor 91, the first heating portion 92 comprises the thin-film heating element 32, the thin-film temperature-sensing element 35 and an upstream region of the supporting portion 73 provided upstream from the heating element 32. The second heating portion 93 comprises the thin-film heating element 34, the thin-film temperature-sensing element 36 and a downstream region of the supporting portion 73 provided downstream from the heating element 34. The intermediate heater of this embodiment comprises the thin-film heating element 33.

Similar to the flow sensor 31, the flow sensor 91 achieves the heating function and the temperature-sensing function under appropriate conditions by controlling the first heating portion 92, the second heating condition 93 and the intermediate heater 33.

Although the flow sensor 91 achieves the heating function and the temperature-sensing function under appropriate conditions, the structure of the first and second heating portions 92 and 93 is complicated and productivity is lowered. Therefore, it is desirable that one of the flow sensor 1 and the flow sensor 91 be selectively used by taking into account the required performance and productivity of the flow sensor.

Further, the present invention is not limited to the above-described embodiments, and variations and modifications may be made without departing from the scope of the present invention.

What is claimed is:

1. A flow sensor for sensing a flow rate of a fluid, comprising:

a first heating portion, provided at a first position in a flow of the fluid, for heating the fluid and for outputting a voltage in response to a temperature of the first position;

a second heating portion, provided at a second, downstream position in the flow of the fluid, for heating the fluid and for outputting a voltage in response to a temperature of the second position, the first position and the second position being spaced from each other in a direction parallel to the flow of the fluid; and an intermediate heater, provided between the first heating portion and the second heating portion, for heating the fluid at an intermediate position between the first position and the second position.

2. The flow sensor according to claim 1, wherein said flow sensor senses a flow rate of the fluid based on a difference between the voltages output by the first heating portion and the second heating portion while the fluid at the first position, at the intermediate position and at the second position is heated by the first heating portion, the intermediate heater and the second heating portion.

3. The flow sensor according to claim 1, wherein each of the first heating portion and the second heating portion comprises a thin-film thermistor heating element.

4. The flow sensor according to claim 1, wherein each of the first heating portion and the second heating portion comprises a thin-film heating element and a thin-film temperature-sensing element.

5. The flow sensor according to claim 1, further comprising a slit provided between the first heating portion and the intermediate heater and a slit provided between the intermediate heater and the second heating portion.

6. The flow sensor according to claim 1, wherein the flow sensor includes a substrate with a cavity therein, and a supporting portion, the supporting portion being formed on the substrate in the shape of a bridge diagonally extending over the cavity of the substrate, and wherein the first heating portion, the intermediate heater and the second heating portion are formed on a surface of the supporting portion, the supporting portion being arranged such that the supporting portion extends in a horizontal direction perpendicular to the flow of the fluid.

7. The flow sensor according to claim 1, wherein the flow sensor includes a substrate with a cavity therein, and a supporting portion, the supporting portion being formed on the substrate in the shape of a bridge diagonally extending over the cavity of the substrate, and wherein the first heating portion, the intermediate heater and the second heating portion are formed on a surface of the supporting portion, the supporting portion being arranged such that the supporting portion extends in a horizontal direction parallel to the flow of the fluid.

8. The flow sensor according to claim 1, wherein the flow sensor includes a substrate with a cavity therein, and a supporting portion, the supporting portion being formed integrally with a surface of the substrate as a diaphragm overlaying the cavity, and wherein the first heating portion, the intermediate heater and the second heating portion are arranged on a surface of the supporting portion.

* * * * *